(12) United States Patent
Xiao et al.

(10) Patent No.: US 11,994,770 B2
(45) Date of Patent: May 28, 2024

(54) CURVED SURFACE BACKLIGHT MODULE AND CURVED SURFACE DISPLAY DEVICE

(71) Applicant: WUHAN CHINA STAR OPTOELECTRONICS TECHNOLOGY CO., LTD., Hubei (CN)

(72) Inventors: Shiyuan Xiao, Hubei (CN); Suimang Song, Hubei (CN)

(73) Assignee: WUHAN CHINA STAR OPTOELECTRONICS TECHNOLOGY CO., LTD., Hubei (CN)

( * ) Notice: Subject to any disclaimer, the term of this patent is extended or adjusted under 35 U.S.C. 154(b) by 0 days.

(21) Appl. No.: 17/597,206

(22) PCT Filed: Dec. 15, 2021

(86) PCT No.: PCT/CN2021/138495
§ 371 (c)(1),
(2) Date: Dec. 29, 2021

(87) PCT Pub. No.: WO2023/102986
PCT Pub. Date: Jun. 15, 2023

(65) Prior Publication Data
US 2024/0036394 A1 Feb. 1, 2024

(30) Foreign Application Priority Data
Dec. 9, 2021 (CN) .......................... 202111500911.7

(51) Int. Cl.
*G02F 1/00* (2006.01)
*G02F 1/13357* (2006.01)

(52) U.S. Cl.
CPC .. *G02F 1/133605* (2013.01); *G02F 1/133603* (2013.01); *G02F 1/133608* (2013.01)

(58) Field of Classification Search
None
See application file for complete search history.

(56) References Cited

U.S. PATENT DOCUMENTS

2013/0033849 A1   2/2013   Roberts
2013/0201684 A1   8/2013   Kon
(Continued)

FOREIGN PATENT DOCUMENTS

| CN | 102037504 A | 4/2011 |
|---|---|---|
| CN | 104407460 A | 3/2015 |
| CN | 104896363 A | 9/2015 |

(Continued)

*Primary Examiner* — Gerald J Sufleta, II (57) ABSTRACT

A curved surface backlight module and a curved surface display device are provided. The backlight module includes a plurality of light-emitting units. The light-emitting units include reflector cups. The plurality of reflector cups include first reflector cups located in an edge partition and second reflector cups located in a central partition. The first reflector cups are asymmetric with respect to a first curved surface normal corresponding to a position at where the first reflector cups are located. A maximum brightness center of the first reflectors of the edge partition can be made to emit light parallel to a user's viewing direction, and brightness attenuation at an edge of a display device can be relieved.

18 Claims, 5 Drawing Sheets

(56) References Cited

U.S. PATENT DOCUMENTS

2016/0195769  A1*  7/2016  Kim .................. G02F 1/133603
                                                        349/61
2022/0365395  A1*  11/2022  Zhang ............... G02F 1/133608

FOREIGN PATENT DOCUMENTS

| CN | 108598130 A | 9/2018 |
| CN | 109188781 A | 1/2019 |
| CN | 109212833 A | 1/2019 |
| CN | 110426894 A | 11/2019 |
| CN | 111446276 A | 7/2020 |
| JP | 2005078937 A | 3/2005 |
| JP | 2005285874 A | 10/2005 |
| JP | 2009295434 A | 12/2009 |
| JP | 2011177974 A | 9/2011 |
| JP | 2018114939 A | 7/2018 |
| KR | 20140052446 A | 5/2014 |

* cited by examiner

CURVED SURFACE BACKLIGHT MODULE AND CURVED SURFACE DISPLAY DEVICE

BACKGROUND OF INVENTION

Field of Invention

The present invention relates to a field of display technology, and particularly to a curved surface backlight module and a curved surface display device.

Description of Prior Art

With development of display panel technology and automotive technology, mini light emitting diodes (mini-LEDs) are used increasingly more in the automotive field due to having characteristics such as high contrast and flexibility, and requirements for automotive display modules are also increasingly higher.

Vehicle-mounted display modules of current stage include mini-LED backlight chips, substrates, curved surface display panels, etc. The mini-LED backlight chips and the substrates are fixed to form mini-LED surface light sources to provide surface light sources for the curved surface display panels. In current vehicle-mounted display module, the closer a position of an edge of the curved display panel is, the more brightness attenuates, which affects users' experience and reduces users' satisfaction.

SUMMARY OF INVENTION

Embodiments of the present invention provide a curved surface backlight module and a curved surface display device to solve a technical problem that brightness attenuation at an edge of the curved display module is relatively serious in the current curved surface display modules.

In order to solve the problems mentioned above, the present invention provides the technical solutions as follows.

On one aspect, one embodiment of the present invention provides a curved surface backlight module. The curved surface backlight module includes a central partition and an edge partition located around the central partition. The curved surface backlight module includes:
- a substrate including a first surface; and
- a plurality of light-emitting units distributed in an array manner and disposed on the first surface, wherein the light-emitting units include reflector cups and light emitting diode (LED) chips located in the reflector cups, and wherein the plurality of reflector cups include first reflector cups located in the edge partition and second reflector cups located in the central partition, and the first reflector cups are asymmetric with respect to a first curved surface normal corresponding to a position at where the first reflector cups are located.

In some embodiments of the present invention, the reflector cups include openings facing away from a side of the substrate, the corresponding LED chips are located in the openings, the openings include lateral walls, and a lateral wall of the first reflector cups is asymmetric with respect to the first curved surface normal corresponding to the position at where the first reflecting cups are located from a direction of the central partition toward the edge partition.

In some embodiments of the present invention, a lateral wall of the second reflector cups is symmetrical with respect to a second curved surface normal corresponding to a position at where the second reflector cups are located.

In some embodiments of the present invention, an included angle between the lateral wall of the second reflector cups relative to the second curved surface normal is $\alpha$, the lateral wall of the first reflector cups includes a first lateral wall close to the central partition and a second lateral wall away from the central partition, a first included angle between the first lateral wall relative to the first curved surface normal is $\beta$, and a second included angle between the second lateral wall relative to the first curved surface normal is $\gamma$, and wherein, $0<\beta<\alpha<90°$, and $90°>\gamma>\alpha>0$.

In some embodiments of the present invention, an included angle between the first curved surface normal corresponding to a position at where any one of the first reflector cups is located and the second curved surface normal corresponding a position at where one of the second reflector cups located in a center of the central partition is located is $\omega$, and wherein $\beta=\alpha-\omega$, and $\gamma=\alpha+\omega$.

In some embodiments of the present invention, intervals between adjacent second reflector cups located in the central partition are greater than intervals between adjacent first reflector cups located in the edge partition.

In some embodiments of the present invention, from the direction of the central partition toward the edge partition, the intervals between the adjacent first reflector cups of the edge partition gradually decrease.

In some embodiments of the present invention, the edge partition includes at least two edge sub-partitions sequentially encircling the central partition; and from the direction of the central partition toward the edge partition, the intervals between the adjacent first reflector cups in the at least two edge sub-partitions gradually decrease, and the intervals between the adjacent first reflector cups in one same edge sub-partition are same.

In some embodiments of the present invention, from the direction of the central partition toward the edge partition, the first included angle of the edge partition gradually decreases, and the second included angle gradually increases.

In some embodiments of the present invention, the intervals between the adjacent second reflector cups of the central partition are same.

In some embodiments of the present invention, an included angle between a tangent to the position at where any one of the first reflector cups is located and a tangent to the position where one of the second reflector cups located at the center of the central partition is located is greater than or equal to 30° and less than 90°.

In some embodiments of the present invention, a light-emitting intensity of the first reflector cups is greater than a light-emitting intensity of the second reflector cups.

In another aspect, one embodiment of the present invention further provides a curved surface display device, including the curved surface backlight module of the aforesaid embodiments and a curved surface display panel disposed on a side of a light-exiting surface of the backlight module. A bending direction of the curved surface backlight module is same as a bending direction of the curved surface display panel.

The embodiments of the present invention provide the curved surface backlight module and the curved surface display device. The curved surface backlight module includes the central partition and the edge partition located around the central partition.

The curved surface backlight module includes the substrate having the first surface and the plurality of light-emitting units disposed on the first surface.

The light-emitting units include the reflector cups and the light emitting diode (LED) chips located in the reflector cups. The plurality of reflector cups include the first reflector cups located in the edge partition and the second reflector cups located in the central partition. The first reflector cups are asymmetric with respect to the first curved surface normal corresponding to the position at where the first reflector cups are located. By designing the curved surface normal corresponding to the first reflector cups with respect to the first reflector cups of the edge partition into an asymmetric structure, light emission tending parallel to a user's viewing direction of a maximum brightness center of the reflector cups of the edge partition can be improved, and brightness attenuation of an edge of the display device can be relieved.

DETAILED DESCRIPTION OF EMBODIMENTS

The technical solutions in the embodiments of the present application are clearly and completely described in the following with reference to the accompanying drawings in the embodiments of the present application. Obviously, the described embodiments are only part of the embodiments of the present application, but are not all embodiments of the present application. All other embodiments obtained by those skilled in the art based on the embodiments of the present application without creative efforts are within the scope of the present application.

In the description of the present application, it is to be understood that the orientation or positional relationship indicated by the terms "center", "upper", "lower", "horizontal", etc. is based on the orientation or positional relationship shown in the accompanying figures, which is merely for the convenience for describing of the present application and for the simplification of the description, and is not intended to indicate or imply that the indicated devices or elements have a specific orientation or is constructed and operated in a specific orientation. Therefore, it should not be understood as a limitation on the present application. Moreover, the terms "first" and "second" are used for descriptive purposes only and are not to be understood as indicating or implying relative importance or implicitly indicating the number of the indicated technical characteristics. Therefore, the characteristics defined by "first" or "second" may include one or more of the described characteristics either explicitly or implicitly. In the description of the present application, the meaning of "a plurality" is two or more unless clearly and specifically defined otherwise.

The following disclosure provides many different embodiments or examples for implementing the different structures of the present application. In order to simplify the disclosure of the present application, the components and configurations of the specific examples are described below. In addition, the present application may repeat reference numerals and/or reference numerals in different examples, which are for the purpose of simplicity and clarity, and do not indicate the relationship between the various embodiments and/or arrangements discussed.

Figure 1:
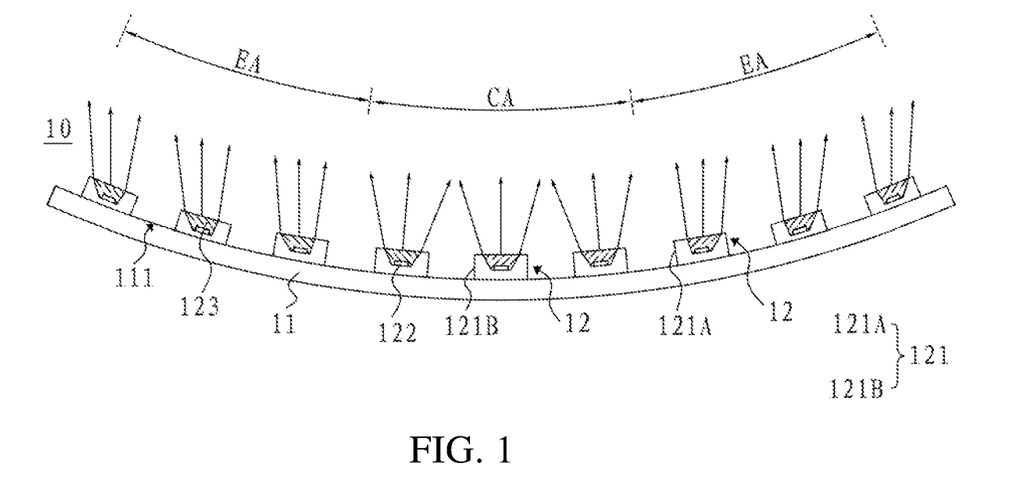
FIG. 1 is a structural schematic diagram of a curved surface backlight module in one embodiment provided by one embodiment of the present invention.

On one aspect, as illustrated in FIG. 1, one embodiment of the present invention provides a curved surface backlight module 10. The backlight module 10 includes a substrate 11 and a plurality of light-emitting units 12 distributed in an array manner. The substrate 11 includes a first surface 111. The light-emitting units 12 are disposed on the first surface 111. The first surface 111 includes a curved surface. Wherein, the light-emitting units 12 include reflector cups 121 and light emitting diode (LED) chips 122 located in the reflector cups 121. A driving circuit (not shown in the figure) is disposed on the substrate 11. The driving circuit is electrically connected to the LED chips 122 to drive the LED chips 122 to emit light. In one embodiment of the present invention, the LED chips 122 can be mini-LED chips.

The reflector cups 121 include openings facing away from a side of the substrate 11. The corresponding LED chips are located in the openings, i.e., a light-emitting direction of the reflector cups 121 faces away from the substrate 11. The lateral wall of the openings is constituted by an inner wall of the reflector cups 121. The lateral wall can be curved, or straight and inclined. An opening area of the openings in a direction facing away from the substrate 11 gradually increases. The light-emitting units 12 further include an encapsulation layer 123 located in the openings of the reflector cups 121. The encapsulation layer 123 is fully filled in the openings of the reflector cups 121. Wherein, fluorescent powders are doped in the encapsulation layer 123. When the LED chips are blue light LED chips, the fluorescent powders can be yellow powders, which emit white light by complementing two colors of a blue light and a yellow light. The fluorescent powders can also include red fluorescent powders and green fluorescent powders at the same time. The blue light emitted by the chips, and a red light and a green light emitted by the fluorescent powders are mixed to emit a white light source. In some embodiments, the LED chips 122 can also be ultraviolet LED chips. The fluorescent powders can include red fluorescent powders, green fluorescent powders, and blue fluorescent powders simultaneously. Near-ultraviolet light emitted by the ultraviolet LED chip excites the three primary colors of red, green and blue fluorescent powders, and white light is finally emitted.

A symmetrical design is adopted in reflector cups in the general current backlight modules. When the backlight module is used in the curved surface display panel, correspondingly, the backlight module is also designed into a curved surface. When the symmetrically designed reflector cups are placed on a curved substrate, a light source emitted by the LED chips has a tendency to converge toward a center of the display panel after being reflected by the reflector cups. As a result, the closer to the edge of the curved surface display panel is, the problem of brightness attenuation becomes increasingly obvious. In the embodiments of the present invention, the structure of the reflective cups in the backlight module are improved to solve the aforesaid defects.

As illustrated in FIG. 1, the curved surface backlight module 10 includes a central partition CA and an edge partition EA located around the central partition CA. The plurality of reflector cups 121 include second reflector cups 121B located in the central partition CA and the first reflector cups 121A located in the edge partition EA. Wherein, the second reflector cups 121B are symmetric structures, and the first reflector cups 121A are asymmetric structures.

In embodiments of the present invention, an opening shape of the second reflector cups 121B can be a circle or other regular polygons, and an opening shape of the first reflector cups 121A can be closed irregular arcs or other irregular shapes. An inner lateral wall (hereinafter referred to as "lateral wall") of the second reflector cups 121B relative to a bottom wall thereof has a certain slope (greater than 0° and less than 90°), and an included angle between the lateral wall and the bottom wall on either side is same. The lateral wall of the first reflector cups 121A relative to a bottom wall thereof also has a certain slope, but included angles between the lateral wall and the lateral wall at different positions are different.

In one embodiment of the present invention, the LED chip 122 is located at the center of the bottom wall of the corresponding reflector cup 121. In other embodiments, an interval can exist between the LED chip 122 and the bottom wall of the corresponding reflector cup 121.

Figure 2A:
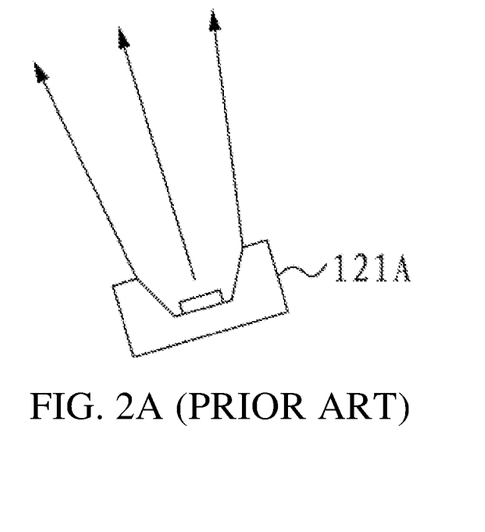
FIG. 2A is a structural schematic diagram of a first reflector cup being a symmetric structure of the prior art.
Figure 2B:
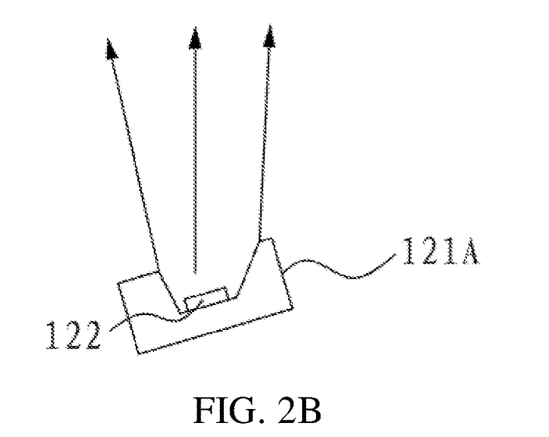
FIG. 2B is a structural schematic diagram of a first reflector cup being an asymmetric structure of the prior art provided by one embodiment of the present invention.

As illustrated in FIG. 2A, because each of the reflector cups 121 is disposed on the curved substrate 11, a whole body formed by the plurality of reflector cups 121 arranged in an arc shape can have a light concentration effect. The light from the center of the maximum brightness of the reflector cup 121 at the edge (first reflective cup 121A) emits parallel to the curved surface normal of the position, causing the light reflected by the reflective cup 121 at the edge to converge to bias to the center of the arc. Therefore, if same symmetrical structures of the first reflector cups 121A around the edge partition EA and the second reflector cup 121B of the central partition CA are maintained, the light emitted by the first reflector cups 121A at peripheral edges of the curved surface backlight module 10 is caused to converge to bias to a center of the arc. As illustrated in FIG. 2B, by configuring the first reflector cups 121A as an asymmetric structure, and by combining disposing both the first reflector cups 121A and the LED chips 122 on the curved substrate 11, the light at the center of the maximum brightness of the first reflector cups 121A can be make to be parallel to user's viewing direction, which improves the brightness attenuation of the edge partition EA.

Figure 3:
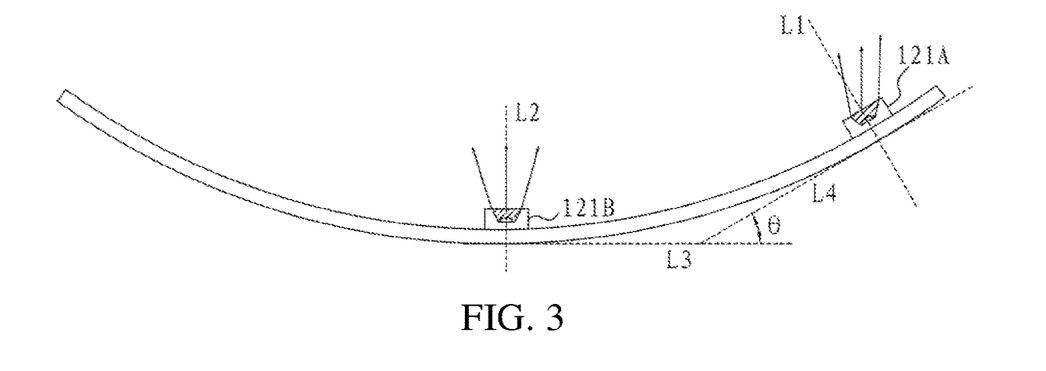
FIG. 3 is a structural schematic diagram of a second reflector cup and the first reflector cup provided by one embodiment of the present invention.

Specifically, as illustrated in FIG. 3, the second reflector cups 121B are symmetrical with respect to a second curved surface normal L2 corresponding to a position at where the second reflector cups 121B are located, and the first reflector cups 121A are asymmetric with respect to a first curved surface normal L1 corresponding to a position at where the first reflector cups 121A are located, which makes the light emitted from the reflector cups 121 of the central partition CA still converge towards the center of the arc, and makes the center of maximum brightness of the light emitted by the reflector 121 of the edge zone EA be as parallel as possible to the user's viewing direction, reducing the brightness attenuation of the edge partition EA. The curved surface normal of the reflector cups 121 mentioned in the embodiments of the present invention refers to a vertical line of a tangent plane corresponding to a point at where the reflector cup 121 is located, and the vertical line passes through the point. Wherein, as a size of the light-emitting units 12 is small, being between 50 and 200 microns, the reflector cup 121 of the light-emitting unit 12 can be regarded as a point in macro scope.

Specifically, a lateral wall of the first reflector cups 121A is asymmetric with respect to the first curved surface normal L1 corresponding to the position at where the first reflecting cups 121A are located from a direction of the central partition CA toward the edge partition EA. A lateral wall of the second reflector cups 121B is symmetrical with respect to a second curved surface normal L2 corresponding to a position at where the second reflector cups 121B are located.

In one embodiment of the present invention, the substrate 11 only has one bending curvature, i.e., a normal direction of the curved surface of the substrate 11 at any position is a corresponding radial direction at the position. In other embodiments, according to actual design requirements, the substrate 11 can have a plurality of different bending curvatures.

Figure 4:
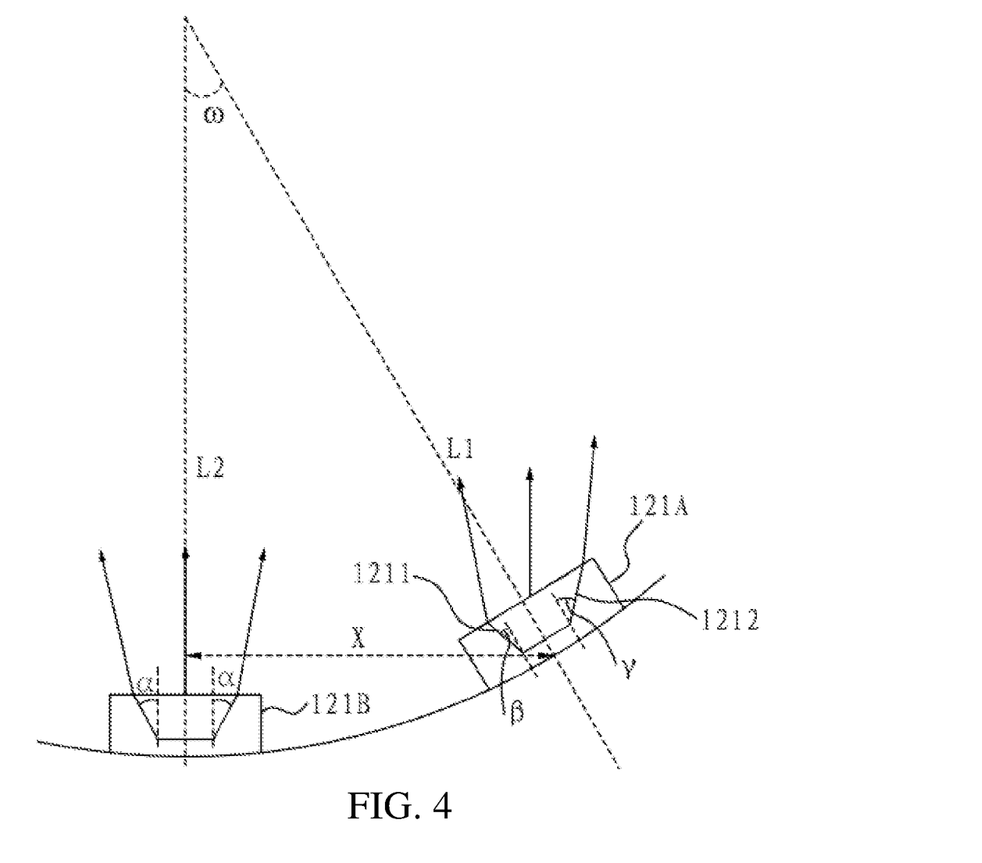
FIG. 4 is another structural schematic diagram of the second reflector cup and the first reflector cup provided by one embodiment of the present invention.

Furthermore, please continue referring to FIG. 4. An included angle between the lateral wall of the second reflector cups 121B relative to the second curved surface normal L2 is α. The first reflector cups 121A includes a first lateral wall 1211 close to the central partition CA and a second lateral wall 1212 away from the central partition. A first included angle between the first lateral wall 1211 relative to the first curved surface normal L1 is β. A second included angle between the second lateral wall 1212 relative to the first curved surface normal L1 is γ. Wherein, $0<\beta<\alpha<90°$, and $90°>\gamma>\alpha>0$. By reducing the included angle of the first reflector cup 121A located in the edge partition EA relative to the lateral wall on the side close to the central partition CA, the included angle of the lateral wall on another side relatively far away from the central partition CA is increased, which can make the light reflected by the LED chip 122 located in the first reflector cup 121A on the left lateral wall of the first reflector cup 121A (close to a side of the central partition CA) tends to be emitted parallel to the viewing direction of human eye (emits vertically upwards in the figure), and can make the light reflected on the right lateral wall also tend to be emitted parallel to the viewing direction of human eye, thereby further relieving brightness attenuation of the edge partition EA.

Figure 5:
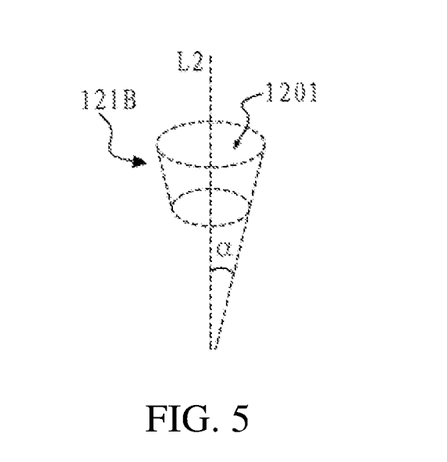
FIG. 5 is a schematic diagram of a three-dimensional structure of the second reflector cup provided by one embodiment of the present invention.

When the lateral wall of the reflector cup 121 is a straight and inclined surface, the included angle between the reflector cup 121 and the corresponding curved surface normal mentioned in this embodiment refers to the included angle between the inclined surface and the curved surface normal. When the lateral wall of the reflector cup 121 is a curved surface, the included angle between the reflector cup 121 and the corresponding curved surface normal mentioned in this embodiment refers to the included angle between the tangent plane of the curved surface corresponding to the lateral wall and the curved surface normal. As illustrated in FIG. 5, a shape of the second reflector cup 121B is taken as an example. The second reflector cup 121B is a cylindrical shape with a wide top and a narrow bottom. A shape of a bottom wall of the second reflector cup 121B is circular. A shape of an opening 1201 of the second reflector cup 121B is circular. An area of the opening 1201 of the second reflector cup 121B along a direction away from the bottom wall gradually increases. The lateral wall of the second reflector cup 121B is a curved surface.

In one specific embodiment, as illustrated in FIG. 4, an included angle between the first curved surface normal L1 corresponding to a position at where any one of the first reflector cups 121A is located and the second curved surface normal L2 corresponding a position at where one of the second reflector cups 121B located in a center of the central partition CA is located is ω, and wherein β=α−ω, and γ=α+ω. Because the light at the center of maximum brightness of the second reflector cup 121B of the center of the central partition CA can be regarded as being parallel to the user's viewing direction, when the substrate 11 is bent from the center to both sides, if an original symmetrical design of the second reflecting cup is maintained, the light of the center of the maximum brightness of the reflector cup at the curved position can be made to deviate from the user's viewing direction by an angle of ω. Therefore, in the embodiments of the present invention, design of the first reflecting cups 121A is an asymmetrical design. By reducing the first included angle β of the first lateral wall 1211 of the first reflector cup 121A by ω relative to the included angle α, the included angle γ of the second lateral wall 1212 is increased by ω relative to the included angle α, so that the light finally emitted by the first reflector cup 121A is made to tend to the user's viewing direction.

The bending radius corresponding to the substrate 11 is R. A horizontal distance X offset by the position at where any one of the first reflector cups 121A is located relative to the second reflector cups 121B in the center of the central partition CA is R Sin θ.

Display screens of different sizes have different attenuation levels at edges and, requirements for brightness of display images are different. In one embodiment of the present invention, small and medium-sized display screens (such as mobile phones, tablets) are taken as examples. Regarding the asymmetric design of the reflector cups 121, the asymmetric design can be started from a position where the substrate 11 is bent 30 degrees relative to a horizontal plane (subjecting to a horizontal plane of a direction of the figure). In other embodiments, the asymmetric design of the reflector cups 121 can also be designed from outside a center position of the substrate 11.

In other words, in one embodiment of the present invention, as illustrated in FIG. 3, an included angle θ between a tangent L4 to the position at where any one of the first reflector cups 121A is located and a tangent L3 to the position where one of the second reflector cups 121B located at the center of the central partition is located is greater than or equal to 30° and less than 90°.

Figure 6:
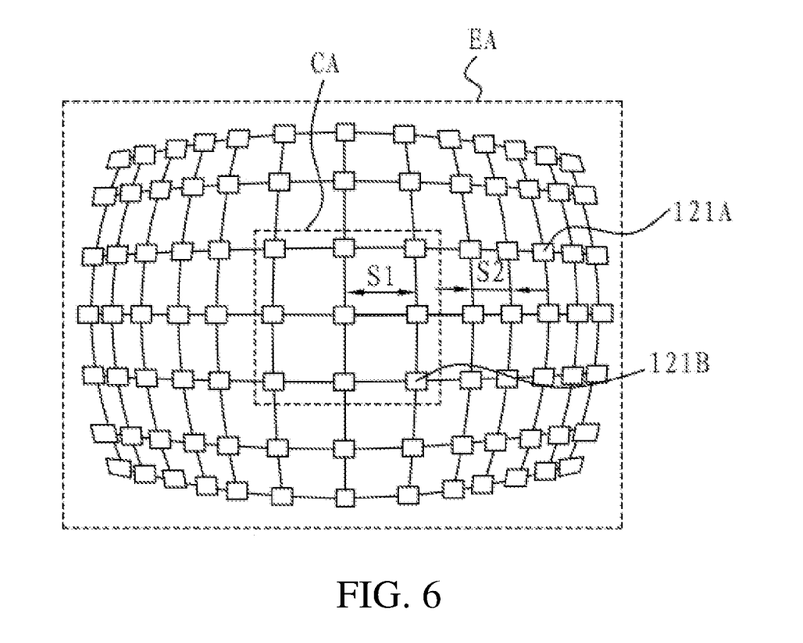
FIG. 6 is a planar schematic diagram of distribution of a plurality of reflector cups provided by one embodiment of the present invention.

Furthermore, as illustrated in FIG. 6, in one embodiment of the present invention, intervals S1 between adjacent second reflector cups 121B located in the central partition CA are greater than intervals S2 between adjacent first reflector cups 121A located in the edge partition EA. By reducing the intervals S2 between the first reflector cups 121A of the edge partition EA, i.e., increasing a distribution density of the first reflector cups 121A of the edge partition EA, the light-emitting intensity of the edge partition EA of the curved surface backlight module 10 can be increased to compensate for the brightness attenuation of the edge partition EA.

In one embodiment of the present invention, because brightness attenuation level of the central partition CA is relatively low, the intervals S1 between the adjacent second reflector cups 121B of the central partition CA can be configured to be same. As the closer to the position of the edge is, the more obvious the brightness attenuation is, in one specific embodiment, from the direction of the central partition CA toward the edge partition EA, the intervals S2 between the adjacent first reflector cups 121A in the edge partition EA can gradually decrease. The change trend of gradual decrement of the intervals S2 can be linear, gradient, or curve, etc.

Furthermore, from the direction of the central partition CA toward the edge partition EA, the first included angle β of the edge partition EA gradually decreases, and the second included angle γ gradually increases, so that the closer to the position of the edge is, the more parallel the direction of light emitted by the first reflector cups 121A to a viewing direction of the human eye is.

Specifically, in some embodiments, according to actual brightness requirements, the edge partition EA can be further divided. The edge partition EA can include a plurality of (at least two) edge sub-partitions sequentially encircling the central partition CA. From the direction of the central partition CA toward the edge partition EA, the intervals S2 between the adjacent first reflector cups 121A in the plurality of (at least two) edge sub-partitions gradually decrease, and the intervals S2 between the adjacent first reflector cups 121A in one same edge sub-partition are same.

In some embodiments, a light-emitting intensity of the first reflector cups 121A can be greater than a light-emitting intensity of the second reflector cups 121B to compensate for the brightness attenuation of the edge partition EA.

Figure 7:
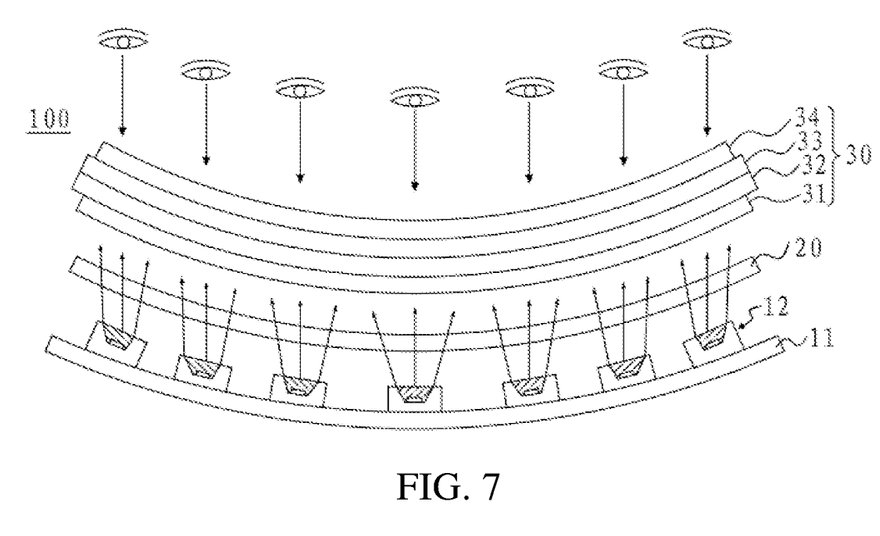
FIG. 7 is a structural schematic diagram of a curved surface display device provided by one embodiment of the present invention.

On another aspect, as illustrated in FIG. 7, one embodiment of the present invention further provides a curved surface display device 100. The curved surface display device 100 includes the curved surface backlight module 10 of the aforesaid embodiments and a curved surface display panel 30. The curved surface display panel 30 is disposed on a side of a light-exiting surface of the backlight module 10. The curved backlight module 10 is a direct-lit backlight module, which provides an entire surface light source for the curved surface display panel 30.

A bending direction of the curved surface backlight module 10 is same as a bending direction of the curved surface display panel 30. In one embodiment of the present invention, the curved surface display panel 30 is an inwardly curved display panel, i.e., display surfaces of the curved surface display panel 30 toward two ends of the curved surface display panel 30 tend to be curved in opposite directions. In other embodiment, the curved surface display panel 30 can also be an outwardly curved display panel, i.e., display surfaces of the curved surface display panel 30 toward the two ends of the curved surface display panel 30 tend to be curved in directions facing away from each other.

The curved surface display panel 30 includes a central display region and an edge display region located around the central display region. The central partition CA of the curved surface backlight module 10 corresponds to the central display region of the curved surface display panel 30. The edge partition EA of the curved surface backlight module 10 corresponds to the edge display region of the curved surface display panel 30.

The curved surface display panel 30 can be a liquid crystal display panel. The curved surface display panel 30 includes a first substrate 32 and a second substrate 33 disposed opposite to each other, a liquid crystal layer sandwiched between the first substrate 32 and the second substrate 33, a first polarizer 31 disposed outside the first substrate 32, and a second polarizer 34 disposed outside the second substrate 33.

Furthermore, an optical film 20 is further disposed between the curved surface display panel 30 and the curved surface backlight module. The optical film 20 can include at least one of a luminance-enhancing film, or a diffusion sheet.

The curved surface display device 100 provided by the embodiments of the present invention can be used in a vehicle-mounted display field, such as a vehicle-mounted display screen, and can also be used in other curved surface display fields.

In summary, the embodiments of the present invention provide the curved surface backlight module 10 and the curved surface display device 100. The curved surface backlight module 10 includes the central partition CA and the edge partition EA located around the central partition CA. The curved surface backlight module 10 includes the substrate having the first surface 11 and the plurality of light-emitting units 12 disposed on the first surface 111. The light-emitting units 12 include the reflector cups 121 and the LED chips 122 located in the reflector cups 121. The plurality of reflector cups 121 include second reflector cups 121B located in the central partition CA and the first reflector cups 121A located in the edge partition EA. The first reflector cups 121A are asymmetric with respect to the first curved surface normal L1 corresponding to the position at where the first reflector cups 121A are located. By designing the surface normal corresponding to the first reflector cups 121A with respect to the first reflector cups 121A of the edge partition EA into an asymmetric structure, light emission tending parallel to a user's viewing direction of a maximum brightness center of the reflector cups of the edge partition can be improved, and brightness attenuation of an edge of the display device can be relieved.

In the embodiments mentioned above, the descriptions to the various embodiments are emphasized, and the part is not described in detailed in an embodiment, can refer to the detailed description of other embodiments mentioned above.

The curved surface backlight module and the curved surface display device provided by the embodiments of present invention are described in detail above. This article uses specific cases for describing the principles and the embodiments of the present invention, and the description of the embodiments mentioned above is only for helping to understand the method and the core idea of the present invention. It should be understood by those skilled in the art, that it can perform changes in the technical solution of the embodiments mentioned above, or can perform equivalent replacements in part of technical characteristics, and the changes or replacements do not make the essence of the corresponding technical solution depart from the scope of the technical solution of each embodiment of the present invention.

What is claimed is:

1. A curved surface backlight module, wherein the curved surface backlight module comprises a central partition and an edge partition located around the central partition, and the curved surface backlight module comprises:
    a substrate comprising a first surface; and
    a plurality of light-emitting units distributed in an array manner and disposed on the first surface, wherein the light-emitting units comprise reflector cups and light emitting diode (LED) chips located in the reflector cups, and
    wherein the plurality of reflector cups comprise first reflector cups located in the edge partition and second reflector cups located in the central partition, and the first reflector cups are asymmetric with respect to a first curved surface normal corresponding to a position at where the first reflector cups are located;
    wherein intervals between adjacent second reflector cups located in the central partition are greater than intervals between adjacent first reflector cups located in the edge partition.

2. The curved surface as claimed in claim 1, wherein the reflector cups comprise openings facing away from a side of the substrate, the corresponding LED chips are located in the openings, the openings comprise lateral walls, and a lateral wall of the first reflector cups is asymmetric with respect to the first curved surface normal corresponding to the position at where the first reflecting cups are located from a direction of the central partition toward the edge partition.

3. The curved surface as claimed in claim 2, wherein a lateral wall of the second reflector cups is symmetrical with respect to a second curved surface normal corresponding to a position at where the second reflector cups are located.

4. The curved surface as claimed in claim 3, wherein an included angle between the lateral wall of the second reflector cups relative to the second curved surface normal is $\alpha$, the lateral wall of the first reflector cups comprises a first lateral wall close to the central partition and a second lateral wall away from the central partition, a first included angle between the first lateral wall relative to the first curved surface normal is $\beta$, and a second included angle between the second lateral wall relative to the first curved surface normal is $\gamma$, and wherein, $0<\beta<\alpha<90°$, and $90°>\gamma>\alpha>0$.

5. The curved surface as claimed in claim 4, wherein an included angle between the first curved surface normal corresponding to a position at where any one of the first reflector cups is located and the second curved surface normal corresponding a position at where one of the second reflector cups located in a center of the central partition is located is $\omega$, and wherein $\beta=\alpha-\omega$, and $\gamma=\alpha+\omega$.

6. The curved surface as claimed in claim 1, wherein from the direction of the central partition toward the edge partition, the intervals between the adjacent first reflector cups of the edge partition gradually decrease.

7. The curved surface as claimed in claim 6, wherein the edge partition comprises at least two edge sub-partitions sequentially encircling the central partition; and from the direction of the central partition toward the edge partition, the intervals between the adjacent first reflector cups in the at least two edge sub-partitions gradually decrease, and the intervals between the adjacent first reflector cups in one same edge sub-partition are same.

8. The curved surface as claimed in claim 7, wherein from the direction of the central partition toward the edge partition, the first included angle of the edge partition gradually decreases, and the second included angle gradually increases.

9. The curved surface as claimed in claim 1, wherein the intervals between the adjacent second reflector cups of the central partition are same.

10. The curved surface as claimed in claim 4, wherein an included angle between a tangent to the position at where any one of the first reflector cups is located and a tangent to the position where one of the second reflector cups located at the center of the central partition is located is greater than or equal to 30° and less than 90°.

11. The curved surface as claimed in claim 1, wherein a light-emitting intensity of the first reflector cups is greater than a light-emitting intensity of the second reflector cups.

12. A curved surface display device, comprising a curved surface backlight module and a curved surface display panel disposed on a side of a light-exiting surface of the backlight module, wherein a bending direction of the curved surface backlight module is same as a bending direction of the curved surface display panel, wherein the curved surface backlight module comprises a central partition and an edge partition located around the central partition, and the curved surface backlight module comprises:

a substrate comprising a first surface; and a plurality of light-emitting units distributed in an array manner and disposed on the first surface, wherein the light-emitting units comprise reflector cups and light emitting diode (LED) chips located in the reflector cups, and wherein the plurality of reflector cups comprise first reflector cups located in the edge partition and second reflector cups located in the central partition, the first reflector cups are asymmetric with respect to a first curved surface normal corresponding to a position at where the first reflector cups are located;

wherein the reflector cups comprise openings facing away from a side of the substrate, the corresponding LED chips are located in the openings, the openings comprise lateral walls, and a lateral wall of the first reflector cups is asymmetric with respect to the first curved surface normal corresponding to the position at where the first reflecting cups are located from a direction of the central partition toward the edge partition;

wherein a lateral wall of the second reflector cups is symmetrical with respect to a second curved surface normal corresponding to a position at where the second reflector cups are located;

wherein an included angle between the lateral wall of the second reflector cups relative to the second curved surface normal is $\alpha$, the lateral wall of the first reflector cups comprises a first lateral wall close to the central partition and a second lateral wall away from the central partition, a first included angle between the first lateral wall relative to the first curved surface normal is $\beta$, and a second included angle between the second lateral wall relative to the first curved surface normal is $\gamma$, and wherein, $0<\beta<\alpha<90°$, and $90°>\gamma>\alpha>0$;

wherein an included angle between the first curved surface normal corresponding to a position at where any one of the first reflector cups is located and the second curved surface normal corresponding a position at where one of the second reflector cups located in a center of the central partition is located is $\omega$, and wherein $\beta=\alpha-\omega$, and $\gamma=\alpha+\omega$.

13. The curved surface display device as claimed in claim 12, wherein intervals between adjacent second reflector cups located in the central partition are greater than intervals between adjacent first reflector cups located in the edge partition.

14. The curved surface display device as claimed in claim 13, wherein from the direction of the central partition toward the edge partition, the intervals between the adjacent first reflector cups of the edge partition gradually decrease.

15. The curved surface display device as claimed in claim 14, wherein the edge partition comprises at least two edge sub-partitions sequentially encircling the central partition; and from the direction of the central partition toward the edge partition, the intervals between the adjacent first reflector cups in the at least two edge sub-partitions gradually decrease, and the intervals between the adjacent first reflector cups in one same edge sub-partition are same.

16. A curved surface backlight module, wherein the curved surface backlight module comprises a central partition and an edge partition located around the central partition, and the curved surface backlight module comprises:

a substrate comprising a first surface; and a plurality of light-emitting units distributed in an array manner and disposed on the first surface, wherein the light-emitting units comprise reflector cups and light emitting diode (LED) chips located in the reflector cups, and wherein the plurality of reflector cups comprise first reflector cups located in the edge partition and second reflector cups located in the central partition, and the first reflector cups are asymmetric with respect to a first curved surface normal corresponding to a position at where the first reflector cups are located;

wherein the reflector cups comprise openings facing away from a side of the substrate, the corresponding LED chips are located in the openings, the openings comprise lateral walls, and a lateral wall of the first reflector cups is asymmetric with respect to the first curved surface normal corresponding to the position at where the first reflecting cups are located from a direction of the central partition toward the edge partition;

wherein a lateral wall of the second reflector cups is symmetrical with respect to a second curved surface normal corresponding to a position at where the second reflector cups are located;

wherein an included angle between the lateral wall of the second reflector cups relative to the second curved surface normal is $\alpha$, the lateral wall of the first reflector cups comprises a first lateral wall close to the central partition and a second lateral wall away from the central partition, a first included angle between the first lateral wall relative to the first curved surface normal is $\beta$, and a second included angle between the second lateral wall relative to the first curved surface normal is $\gamma$, and wherein, $0<\beta<\alpha<90°$, and $90°>\gamma>\alpha>0$;

wherein an included angle between a tangent to the position at where any one of the first reflector cups is located and a tangent to the position where one of the second reflector cups located at the center of the central partition is located is greater than or equal to 30° and less than 90°.

17. The curved surface as claimed in claim 16, wherein an included angle between the first curved surface normal corresponding to a position at where any one of the first reflector cups is located and the second curved surface normal corresponding a position at where one of the second reflector cups located in a center of the central partition is located is $\omega$, and wherein $\beta=\alpha-\omega$, and $\gamma=\alpha+\omega$.

18. The curved surface as claimed in claim 16, wherein a light-emitting intensity of the first reflector cups is greater than a light-emitting intensity of the second reflector cups.

* * * * *